United States Patent
Maimone (10) Patent No.: US 6,418,451 B1
(45) Date of Patent: Jul. 9, 2002

(54) METHOD, APPARATUS, AND COMPUTER PROGRAM PRODUCT FOR PERSISTING OBJECTS IN A RELATIONAL DATABASE

(75) Inventor: William D. Maimone, Birdsboro, PA (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/342,663

(22) Filed: Jun. 29, 1999

(51) Int. Cl.$^7$ ............................................. G06F 17/00
(52) U.S. Cl. ............... 707/200; 707/103 R; 707/103 Z; 707/103 Y; 707/4; 709/315
(58) Field of Search ............... 707/1–206; 709/310–320

(56) References Cited

U.S. PATENT DOCUMENTS

| | | | |
|---|---|---|---|
| 5,426,780 A | 6/1995 | Gerull et al. ................... 707/1 |
| 5,499,371 A | 3/1996 | Henninger et al. ......... 707/102 |
| 5,764,973 A | 6/1998 | Lunceford et al. ............. 707/3 |
| 5,781,907 A * | 7/1998 | Blackmun et al. ............. 707/3 |
| 5,794,030 A * | 8/1998 | Morsi et al. ................. 707/100 |
| 5,794,039 A * | 8/1998 | Guck ............................ 707/4 |
| 5,809,505 A | 9/1998 | Lo et al. ..................... 707/102 |
| 5,864,864 A | 1/1999 | Lerner ........................ 707/102 |

OTHER PUBLICATIONS

Trujillo et al., "Designing data warehouses with OO conceptual models", Computer, vol. 34, Issue 12, Dec. 2001, pp. 66–75.*

Snned, "Impact analysis of maintenance tasks for aq distributed object–oriented system", Software Maintenance, 2001, Proceedings, IEEE International Conference on, 2001, pp. 180–189.*

Czedo et al., "Design of a data warehouse over object–oriented and dynamically evolving data sources", Database and Expert Systems Applications, 2001, Proceedings, 12th International Workshop on, 2001, pp. 128–132.*

Cassel et al., "An object–oriented multi–mediator browser", User Interfaces to Data Intensive Systems, 2001, UIDIS 2001, Proceedings, Second International Workshop on, 2001, pp. 26–35.*

* cited by examiner

*Primary Examiner*—David Jung
(74) *Attorney, Agent, or Firm*—Michael B. Atlass; Mark T. Starr

(57) ABSTRACT

A method, apparatus, and computer program product enable objects of an object-oriented environment to be persisted in a relational database. An object to be persisted first stores its attributes in a property bag. It is then determined whether the schema of the relational database supports the storage of objects of the class of the object to be persisted. If not, the relational database is dynamically reconfigured using commands of a data definition language of the relational database so that the schema supports the storage of objects of that class. This may include the creation of a new table for that class of objects or the modification of an existing table to accommodate new or different attributes of that class. Once any necessary modifications to the database schema have been made, commands of a data manipulation language of the relational database are generated to store in the appropriate table the attributes from the property bag of the object to be persisted.

12 Claims, 7 Drawing Sheets

```
Save()
{
    PersistObjectIntoPropertyBag();
    SynchronizeSchema();
    UpdateTableWithObjectAttributeValue();
}

Load()
{
    For All Columns in Table(ClassOfObject)
    {
        AttributeValue = Table(ClassOfObject,AttributrName);
    }
}
```

```
PersistObjectIntoPropertyBag()
{
        For All Nested Objects
        {
                AugmentAttributeNameWithNameofClass();
                For All Attributes of Nested Objects
                {
                        StoreAttributeinPropertyBag(Name,Type,andValue);
                }
        }
        For All Attributes of Main Object
        {
                StoreAttributeinPropertyBag(Name,Type,andValue);
        }
}
```

*Figure 3a*

```
SynchronizeSchema()
{
    FindTable(ClassOfObject)
    If Not Found
    {
        CreateTable(ClassOfObject);
        For All Attributes In Property Bag
        {
            CreateTableColumn(ClassOfObject, AttributeName, AttributeType);
        }
    }
    Else /* Table for object class is found */
    {
        /* Compare schema with property bag attribures and update if necessary */
        For All Attributes In Property Bag
        {
            If Not TableColumnExists(ClassOfObject, AttributeName)
            {
                CreateTableColumn(ClassOfObject, AttributeName, AttributeType);
            }
        }
    }
}
```

*Figure 3b*

```
UpdateTableWithObjectAttributeValue()
{
      For All Attributes in Property Bag
      {
            Table(ClassOfObject, AttributeName) = AttributeValue;
      }
}
```

*Figure 3c*

```
Save()
{
    PersistObjectIntoPropertyBag();
    SynchronizeSchema();
    UpdateTableWithObjectAttributeValue();
}

Load()
{
    For All Columns in Table(ClassOfObject)
    {
        AttributeValue = Table(ClassOfObject,AttributrName);
    }
}
```

METHOD, APPARATUS, AND COMPUTER PROGRAM PRODUCT FOR PERSISTING OBJECTS IN A RELATIONAL DATABASE

COPYRIGHT NOTICE

A portion of the disclosure of this patent document contains material that is subject to copyright protection. The copyright owner has no objection to the facsimile reproduction by anyone of the patent document or the patent disclosure as it appears in the United States Patent & Trademark Office patent file or records, but otherwise reserves all copyright rights whatsoever.

BACKGROUND

1. Field of the Invention

The present invention is directed to computer systems, and more particularly, to methods, apparatus, and computer program products for persisting objects of an object-oriented environment in a relational database.

2. Description of the Prior Art

Relational databases represent one of the greatest advances in database technology. The feature that sets a relational database apart from earlier database technologies is the ability to separate the structure of the database from how the data is accessed. In earlier technologies, the structure of the data in a database and how it is accessed were tightly linked. This meant that if a programmer wanted to access the data from a different perspective, it could be very difficult. Relational databases introduce a data definition language to describe the structure of the data, and a separate data manipulation language to access the data. This allows programmers to access the data independently of how the data is actually structured.

Relational databases gain their flexibility from the fact that their data resides in tables that are largely independent of each other. Data can be added, deleted, or changed in one table without affecting the data in another table, provided the first table is not a parent of the other table. A table is a two-dimensional array of rows and columns. Every column in a database table embodies a single attribute of the table, and a column has the same meaning in every row of the table. For example, a table may contain the names, addresses, and phone numbers of all of the employees of a company. Each row of the table, also commonly referred to a record, holds the data for a single employee. Each column holds a single attribute, such as employee ID, employee name, street, city, state, postal code, or telephone number.

The structure of an entire database is its schema. The schema is sometimes also referred to as the conceptual view or the complete logical view of the database. The schema is metadata and, as such, is a part of the database. The metadata itself, which describes the structure of the database, is stored in tables similar to the tables described above used to store data. A schema contains information that identifies the tables that have been created to store data.

The data definition language of a relational database is used to create, change, or destroy the basic elements of a relational database, such as its schema and its tables. The data manipulation language of a relational database is used to operate on the data stored in the database, e.g., to insert, update, delete, or select data in the database.

Structured query language (SQL) is an ANSI standard language that has been specifically designed for the creation and maintenance of relational databases. SQL includes both data definition language commands and data manipulation language commands. For example, the data definition language of SQL includes a CREATE TABLE command that is used to create a table in the relational database. Within the command, the name and data type for each column of the table are specified. An ALTER TABLE command is provided for changing the table by, for example, adding, changing, or deleting a column in the table. The data manipulation language of SQL includes commands such as INSERT, UPDATE, DELETE, and SELECT that allow you to add, change, delete, and retrieve data in the rows (i.e., records) of a table.

Despite the significant advance that relational databases represent, there are still some issues with relational databases. For example, with a relational database, the structure of the database (schema) still has to be manually described, both initially and when changes are needed. Also, in a large database structure that can support diverse environments, a particular user might only use a small portion of the database, i.e., the portion relevant to the users environment, leaving much of the database structure unnecessary for that environment. Finally, relational databases are difficult to use in an object-oriented environment in which it is desired to store (i.e., persist) objects in a relational database.

Accordingly, there is a need for new methods, apparatus, and computer program products that improve the ability to persist objects of an object-oriented environment in a relational database. The present invention satisfies this need.

SUMMARY OF THE INVENTION

The present invention is directed to a method, apparatus, and computer program product for enabling objects of an object-oriented environment to be persisted in a relational database. In accordance with the present invention, an object to be persisted first stores its attributes in a property bag. A determination is then made whether the schema of the relational database supports the storage of objects of the class of the object to be persisted. If not, the relational database is dynamically reconfigured using commands of a data definition language of the relational database so that the schema supports the storage of objects of that class. This may include the creation of a new table for that class of objects or the modification of an existing table to accommodate new or different attributes of that class. Once any necessary modifications to the database schema have been made, commands of a data manipulation language of the relational database are generated to store in the appropriate table the attributes from the property bag of the object to be persisted.

Additional features and advantages of the present invention will become evident hereinafter.

BRIEF DESCRIPTION OF THE DRAWINGS

The foregoing summary, as well as the following detailed description of the preferred embodiment, is better understood when read in conjunction with the appended drawings. For the purpose of illustrating the invention, there is shown in the drawings an embodiment that is presently preferred, it being understood, however, that the invention is not limited to the specific methods and instrumentalities disclosed. In the drawings.

DETAILED DESCRIPTION OF THE PREFERRED EMBODIMENT

Figure 1:
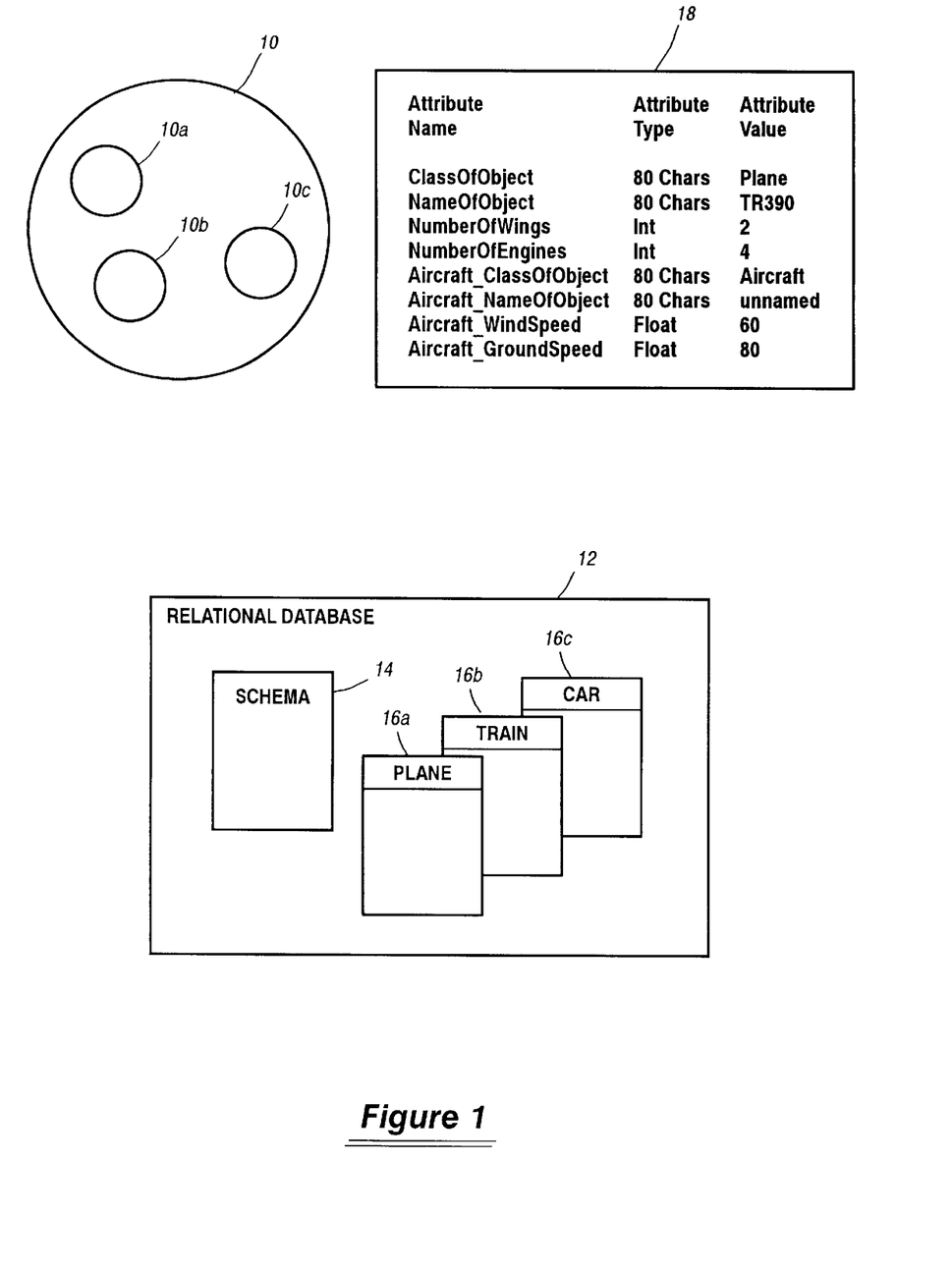
FIG. 1 depicts an exemplary system in which the present invention may be employed.

Referring to the drawings, wherein like numerals represent like elements throughout, FIG. 1 illustrates an exemplary system in which the present invention may be employed. In this system, an object 10 has been instantiated from a class in an object-oriented environment. The object 10 has attributes which may include, for example, the class from which it has been instantiated, the name, if any, assigned to the object, and each of the member variables of the object. Each attribute typically has a name, a data type, and a value. Objects can be implemented and instantiated using a variety of different computer programming languages that support object orientation, such as, for example, the C++ or Java programming languages. The principles of object oriented computer programming are well know.

Many object-oriented programming environments support the concept of a property bag. A property bag is a container in which an object can persistently save its attributes (i.e., properties). As one example of a property bag mechanism provided in an object-oriented environment, Microsoft Corporation's Component Object Model (COM) technology supplies an IPersistPropertyBag interface and an IPropertyBag interface. The IPersistPropertyBag interface works in conjunction with the IPropertyBag interface to define an individual attribute-based persistence mechanism. An object implements the IPersistPropertyBag interface to enable saving its attributes persistently. A container calls the methods on this interface to instruct an object to load (IPersistPropertyBag::Load) or save (IPersistPropertyBag::Save) its attributes to the supplied property bag. The container implements the IPropertyBag interface to provide the object with a way to store its attributes in the property bag. The object calls the methods on the IPropertyBag interface to read and write its attributes into the container provided property bag. Specifically, IPropertyBag::Write is used to write an attribute to the property bag, and IPropertyBag::Read is used to retrieve a property.

Object oriented programming environments also typically support the concept of nested objects, in which one object is nested within another. Thus, for example, the object 10 may contain a plurality of nested objects 10a, 10b, 10c, etc. A nested object may either represent a parent class from which the class of the object in question inherits, or the nested object may be an object valued attribute (i.e., a member variable of an object that is itself an object). As used herein and in the claims, the term "nested object" is intended to encompass both such possibilities.

According to the present invention, the attributes of both a main object and all of its nested objects are stored in a property bag. In order to distinguish the attributes of the main object from those of its nested object, the attribute names of each nested object are augmented by, for example, prepending the class name of each nested object to each of its attribute names. This process is sometimes referred to in the art as name mangling.

An exemplary property bag 18 is shown in FIG. 1 for an object, such as object 10, that is an instantiation of a class Plane, which inherits from a parent class Aircraft. Class Plane contains member variables NumberOfWings and NumberOfEngines, which are attributes of the class (and hence of the object 10 that is instantiated from it). When the object 10 is instantiated from class Plane, it will contain a nested object representing the parent class Aircraft and its attributes WindSpeed and GroundSpeed. Thus, in the example shown, the property bag 18 contains the attributes of the main object having the names ClassOfObject (the name of the class of the main object), NameOf Object (the name assigned to this particular instantiation of class Plane), and NumberOfWings and NumberOf Engines (the names of the member variables). The property bag also contains the attributes of the nested object that represents the parent class Aircraft. The names of each of these attributes have been augmented (i.e., mangled) to identify their relation to the attributes of the main object. Thus, the attribute names of the nested object are Aircraft_ClassOfObject, Aircraft_NameOfObject, Aircraft_WindSpeed, and Aircraft_GroundSpeed. Other nested objects would be handled in a similar manner.

As further shown in FIG. 1, the system further comprises a relational database 12 having a schema 14 that includes one or more tables 16a, 16b, 16c for storing information. The system of FIG. 1, including the relational database 12, the instantiated object 12, and the property bag 18 may be implemented in a computer system (see FIG. 5). These parts of the system may reside, for example, in the main memory and/or secondary memory of the computer system.

The present invention is directed to a method, apparatus, and computer program product for enabling objects of an object-oriented environment, such as object 10, to be persisted in a relational database, such as database 12. In accordance with the present invention, an object to be persisted first stores its attributes in a property bag. A determination is then made whether the schema of the relational database supports the storage of objects of the class of the object to be persisted. If not, the relational database is dynamically reconfigured using commands of a data definition language of the relational database so that the schema supports the storage of objects of that class. This may include the creation of a new table for that class of objects or the modification of an existing table to accommodate new or different attributes of that class. Once any necessary modifications to the database schema have been made, commands of a data manipulation language of the relational database are generated to store in the appropriate table the attributes from the property bag of the object to be persisted.

Figure 2:
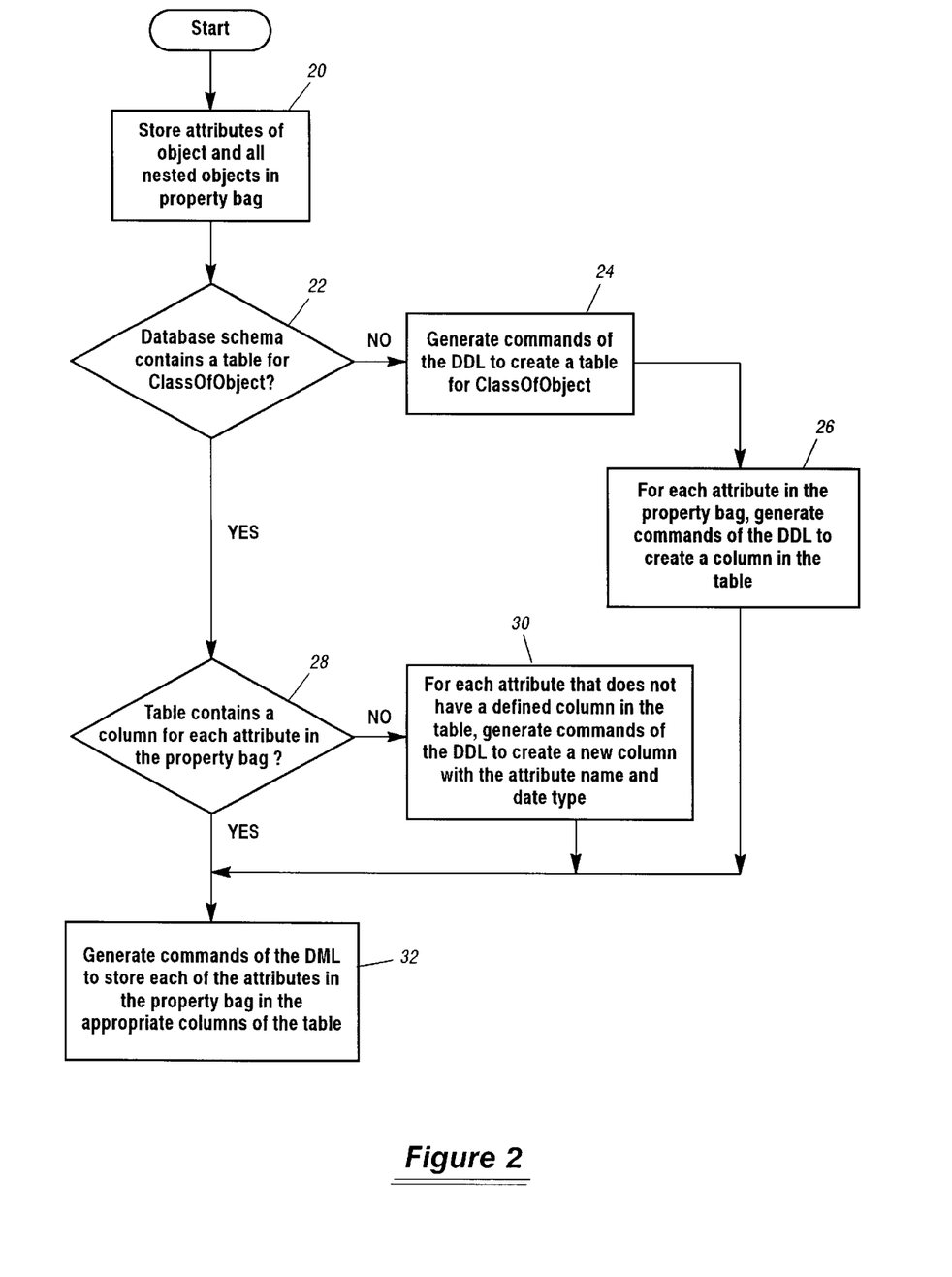
FIG. 2 is a flow diagram illustrating a method of the present invention.

FIG. 2 is a flow diagram illustrating one embodiment of the method of the present invention. The method is initiated when an object either receives a message, or chooses on its own, to persist its attributes in a relational database. According to the method of the present invention, at step 20, the object stores its attributes, including the attributes of any nested objects, in a property bag. In a COM environment, this may be accomplished, for example, by invoking the IPropertyBag::Write method. Next, at step 22, a determination is made whether the schema of the relational database already contains a table for the class of the object to be persisted (ClassOfObject). It may be the case that other objects of this class have already been persisted in the database and thus a table within the database schema has already been created. If not, however, then at step 24, commands of the data definition language (DDL) of the relational database are generated and issued to the database to create a table for this class of object. For a SQL database, for example, a CREATE TABLE command may be generated. Preferably, the table is given the name of the class (i.e. ClassOfObject). For instance, in the example illustrated in FIG. 1, a table 16a called "Plane" has been created in the database 12 for the storage of the attributes of objects of class Plane. At step 26, for each of the object's attributes in the property bag, command(s) of the data definition language are generated and issued to the database to create a column in the table for that attribute. Preferably, the column is identified by the name of the attribute and its data type is defined to match that of the attribute. For a SQL database, the columns of the table can be generated concurrently as part of the CREATE TABLE command described above.

If at step 22, it is determined that a table already exists for the class of the object to be persisted, i.e., a table having the same name as the class already exists, then at step 28, it is determined whether appropriate columns (name and data type) are defined within the table for each of the attributes in the property bag. This may not be the case if, for example, the definition of the class has changed since the last time an object of that class was persisted. If the columns do not match the attributes in the property bag, then at step 30, commands of the data definition language of the database are generated to create new columns and/or modify existing columns to conform the table structure to the attributes in the property bag.

Essentially, steps 22 through 30 determine whether the schema of the relational database supports the storage of objects of the class of the object to be persisted, and if not, dynamically reconfigure the database using its data definition language to make sure that it does support the storage of objects of that class. As used herein and in the claims, the term "dynamically reconfigure" and related forms thereof means to modify the schema of the database, including without limitation, the tables or columns defined within the schema, on-the-fly in a manner that is transparent to the user and to any object to be persisted. As a result, the database schema remains synchronized with the object's class definition, as reflected in the property bag. Changes to an object's class definition can thus be handled dynamically without requiring user or other manual intervention. Moreover, because the database schema is created dynamically, based on the data manipulation requests, only the parts of the schema that are used by the objects in the particular object-oriented environment are created.

At step 32, the process is completed by generating and issuing to the database the appropriate commands of the data manipulation language of the database to cause each of the attributes in the property bag to be stored in the appropriate table and column in the database. For a SQL database, for example, the INSERT and UPDATE commands may be generated and issued to the database to perform the desired data manipulation.

The present invention may be embodied in the form of program code (i.e., instructions) stored on a computer-readable medium, such as a floppy diskette, CD-ROM, DVD-ROM, DVD-RAM, hard disk drive, or any other machine-readable storage medium, wherein, when the program code is loaded into and executed by a machine, such as a computer, the machine becomes an apparatus for practicing the invention. The present invention may also be embodied in the form of program code that is transmitted over some transmission medium, such as over electrical wiring or cabling, through fiber optics, over a network, including the Internet or an intranet, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

FIGS. 3A–3C and 4 illustrate one embodiment of program code that, when executed by a machine, such as a computer, performs the functions of the present invention. The program code is illustrated in these figures in a pseudocode form. This pseudocode representation can be implemented in a variety of programming languages. Preferably, the program code is implemented in a high level procedural or object-oriented programming language, such as, for example, C, C++, or Java. However, the program code can be implemented in assembly or machine language if desired. In any case, the language may be a compiled or an interpreted language.

Figure 3A:
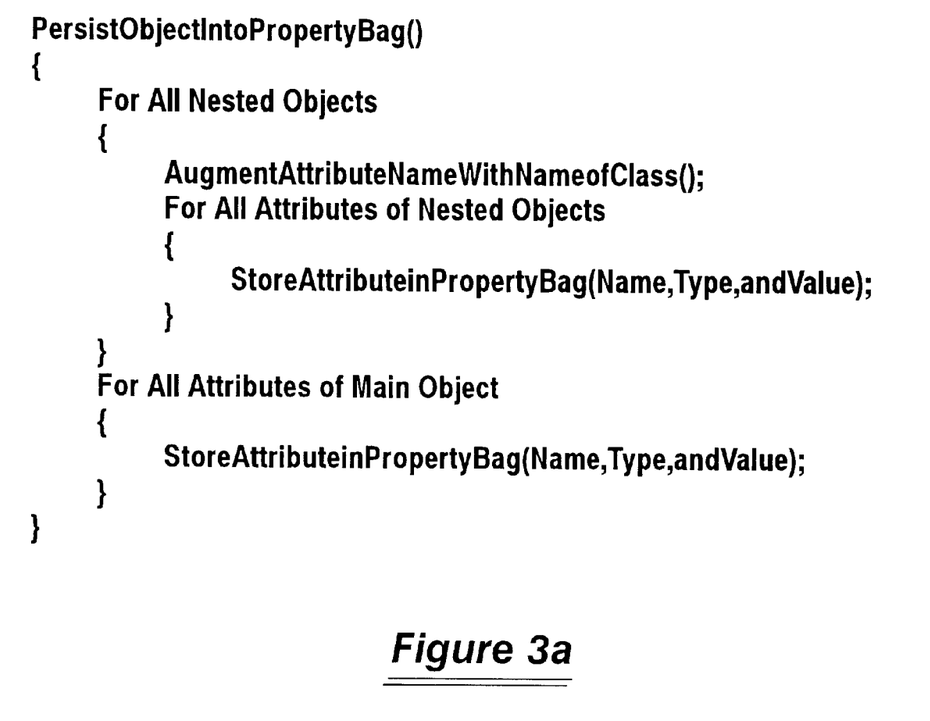
FIGS. 3A–3C and 4 are pseudocode listings illustrating one exemplary embodiment of the present invention in program code.

FIG. 3A is a pseudocode listing of a first method (PersistObjectIntoPropertyBag( )) that, when invoked by an object to be persisted (or by another object or component that desires the attributes of the object in question to be persisted), causes the attributes of the object to be stored in a property bag. As shown, in this particular exemplary embodiment, the method first handles all nested objects within the object to be persisted. For each nested object, an AugmentAttributeNamesWithNameofClass( ) procedure is called that performs the necessary name mangling mentioned above to distinguish the attributes of the nested object from the attributes of the main object in the property bag. Then, for each attribute of the nested object, a StoreAttributeinPropertyBag( ) procedure is called to store the attribute's name, data type, and value in the property bag. Each attribute of the main object is then stored in the property bag using the same procedure. In a COM environment, the StoreAttributeinPropertyBag( ) procedure can be implemented with the Write method on the IPropertyBag interface, as explained above.

Figure 3B:
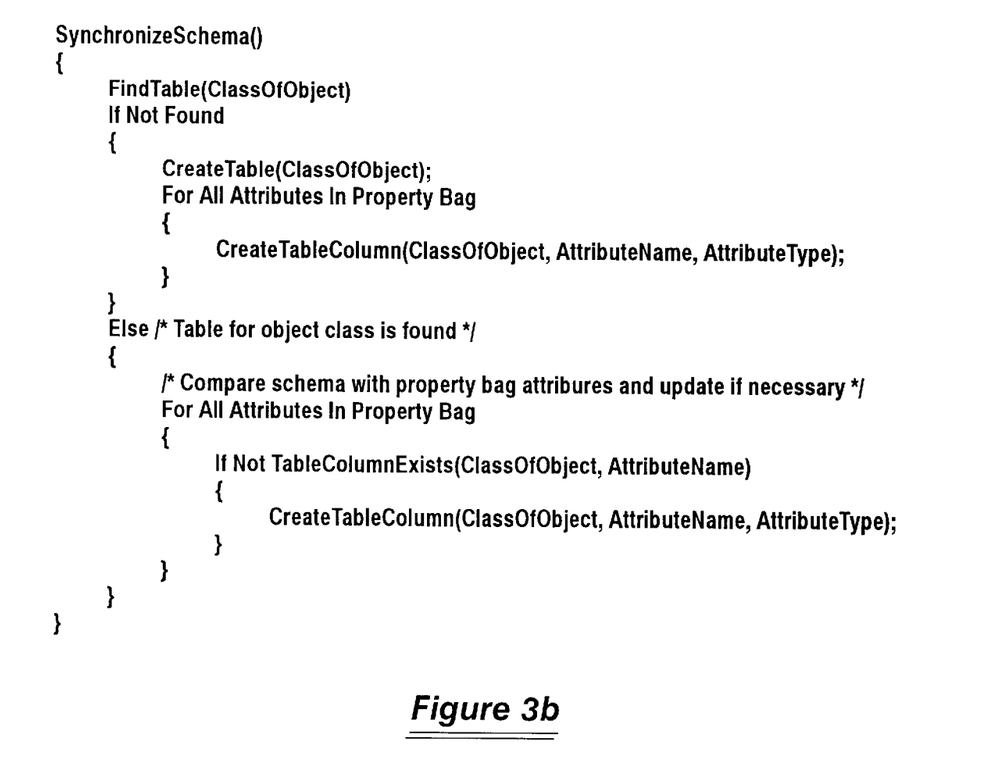

FIG. 3B is a pseudocode listing of a second method (SynchronizeSchema( )) that, when invoked, determines whether the schema of the relational database supports the storage of objects of the class of the object to be persisted, and if not, dynamically reconfigures the relational database using commands of the data definition language of the relational database so that the schema is modified to support the storage of objects of that class. Essentially, this method synchronizes the current class definition of the object with the database schema. Referring to the pseudocode listing, a FindTable(ClassOfObject) procedure is provided that queries the database to determine if a table having the name of the object's class (i.e., ClassOfObject) already exists. If no such table is found, then a CreateTable(ClassOfObject) procedure is called that generates the appropriate commands of the data definition language of the relational database (e.g., CREATE TABLE in a SQL database) to create the table. Then, for each attribute in the object's property bag, a CreateTableColumn( ) procedure is called that generates the appropriate DDL commands to define a column in the table having the name and data type of the attribute. In other embodiments, the procedures for creating the table and for creating the columns of the table can be combined into a single procedure.

If a table for the class of the object to be persisted already exists, then this second method compares the schema with the property bag attributes to determine whether any update to the table is necessary, for example, as the result of a change in the class definition for this object. If for a given attribute, a column having the same name and data type does not exist (i.e., TableColumnExists( ) returns false), then a new column is created using the same CreateTableColumn( ) procedure as described above. In other embodiments of this second method, in the case where a column having the same name as the attribute is located but its data type is different, a ModifyTableColumn( ) procedure (not shown) can be called to generate the appropriate DDL command(s) to change the data type of the column to conform to the new data type of the attribute.

Figure 3C:
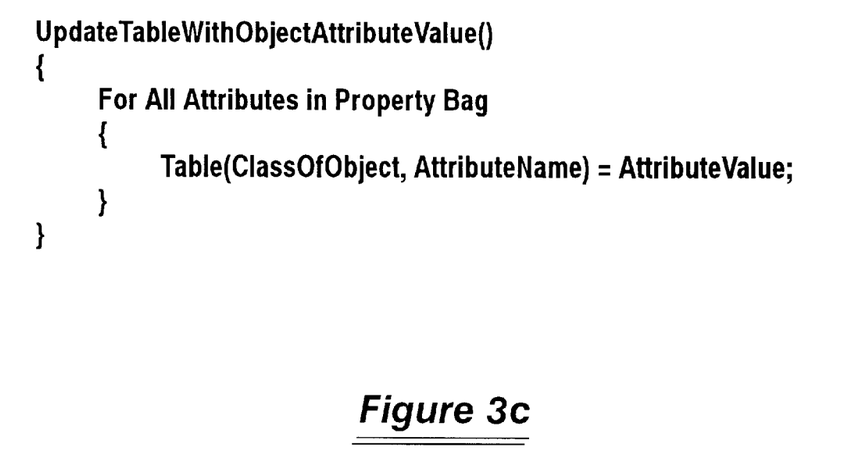

FIG. 3C is a pseudocode listing of a third method (UpdateTableWithObjectAttributeValues( )) that, when invoked, generates commands of the data manipulation language of the relational database to store the attributes from the property bag of the object in the relational database. For a SQL database, the INSERT or UPDATE commands can be used, for example.

Figure 4:
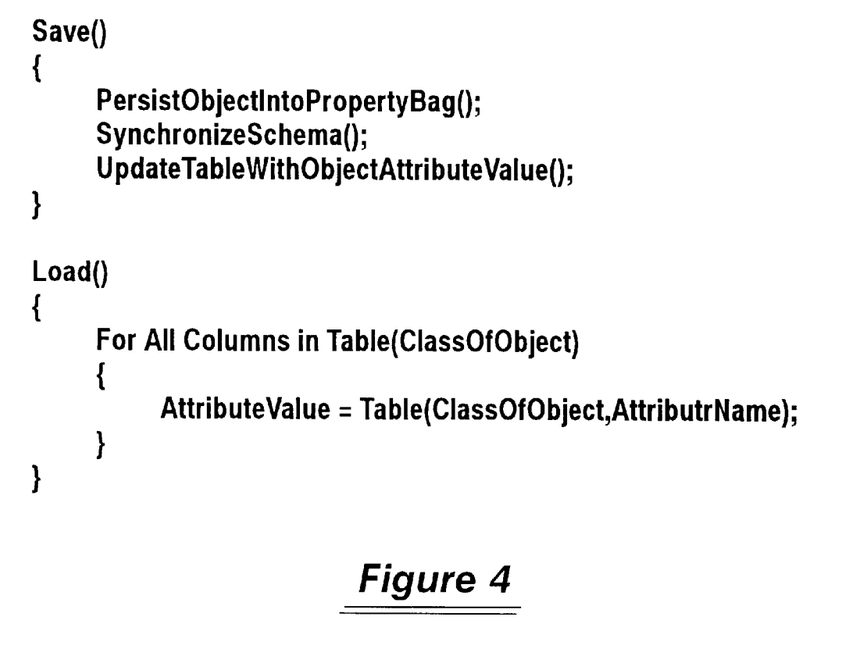

FIG. 4 is a pseudocode listing of two methods, Save( ) and Load( ), that can be used in a preferred embodiment to simplify the storage and retrieval of information to and from the relational database. The Save( ) method encapsulates the functionality of the methods of FIGS. 3A, 3B, and 3C into a single method call by invoking them in turn. The Load( ) method retrieves all of the attribute values for a given object from the relational database. The Load( ) method can be implemented using appropriate commands of the data manipulation language of the relational database. For example, for a SQL database, the SELECT command can be used to retrieve the attribute values.

As explained above, the methods illustrated in FIGS. 3A, 3B, 3C, and 4 can be implemented in any high level procedural or object-oriented programming language, such as, for example, C, C++, or Java. Alternatively, the program code can be implemented in assembly or machine language if desired. In any case, the language may be a compiled or interpreted language. Depending upon the computing environment or system in which the present invention is employed, the methods may be implemented together in the form of, for example, a dynamic link library (DLL), a COM component, an ActiveX control, a Java Bean, or any other programming mechanism from which the methods can be invoked by an object or other component. As a further example, the methods could be provided as additional methods on an extended IPropertyBag interface in the COM environment. The data definition language and data manipulation language commands can be issued to the database from within the program code using standard database connectivity APIs, such as the Microsoft ODBC API or the Java JDBC API. These APIs allow a programmer to issue relational database commands to a relational database from a program written in another high-level programming language, such as C, C++, or Java.

Figure 5:
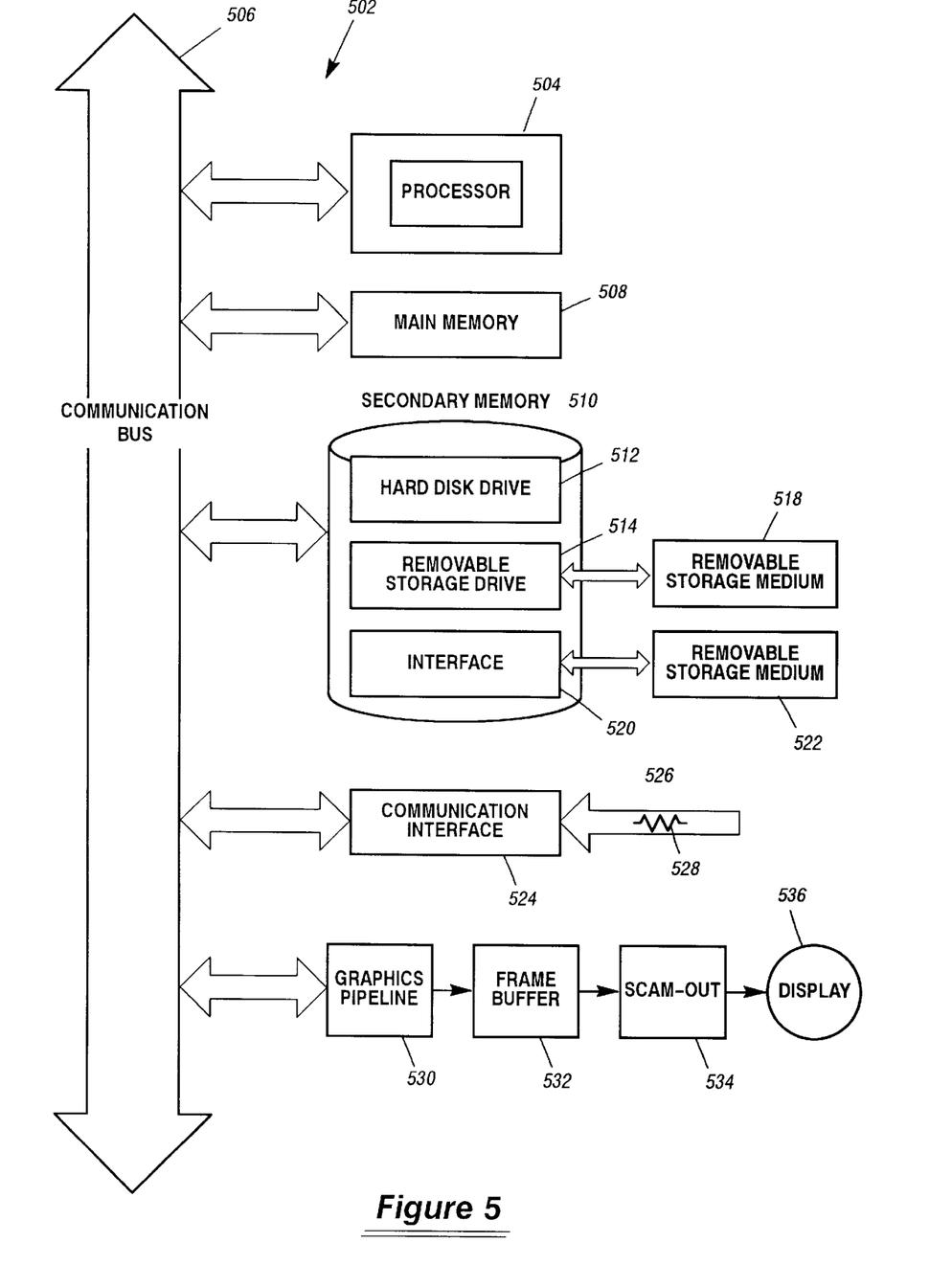
FIG. 5 illustrates an exemplary computer system in which the present invention can be implemented.

As further stated above, the invention may be implemented using hardware, software (i.e., program code) or a combination thereof and may be implemented in a computer system or other processing system. In fact, in one embodiment, the invention is directed toward apparatus, such as a computer system, capable of carrying out the functionality described herein. An example computer system 502 is shown in FIG. 5. The computer system 502 includes one or more processors, such as processor 504. The processor 504 is connected to a communication bus 506. The program code embodiments described above can be viewed in terms of this example computer system.

Computer system 502 also includes a main memory 508, preferably random access memory (RAM), and can also include a secondary memory 510. The secondary memory 510 can include, for example, a hard disk drive 512, a removable storage drive 514, such as a floppy disk drive, a magnetic tape drive, an optical disk drive (CD-ROM, DVD-ROM, DVD-RAM, etc.), or other form of secondary storage. The removable storage drive 514 reads from and/or writes to a computer-readable medium 518 in a well known manner. Computer-readable medium 518 represents any storage medium, such as a floppy disk, magnetic tape, optical disk, etc. which is read by and written to by removable storage drive 514. As will be appreciated, the computer readable medium 518 includes a medium having program code (i.e., instructions) and/or data stored thereon.

In alternative embodiments, secondary memory 510 may include other similar means for allowing program code or other instructions to be loaded into computer system 502. Such means can include, for example, a removable storage unit 522 and an interface 520. Examples of such can include a program cartridge and cartridge interface (such as that found in video game devices), a removable memory chip (such as an EPROM, or PROM) and associated socket, and other removable computer-readable media 522 and interfaces 520 which allow program code and data to be transferred from the computer-readable medium 518 to computer system 502.

Computer system 502 can also include a communications interface 524. Communications interface 524 allows program code and data to be transferred between computer system 502 and external devices. Examples of communications interface 524 can include a modem, a network interface (such as an Ethernet card), a communications port, a PCMCIA slot and card, etc. Program code and data transferred via communications interface 524 are in the form of signals which can be electronic, electromagnetic, optical or other signals capable of being received by communications interface 524. These signals 526 are provided to communications interface via a channel 528. This channel 528 carries signals 526 and can be implemented using wire or cable, fiber optics, a phone line, a cellular phone link, an RF link and other communications channels.

Computer system 502 can also include a graphics pipeline 530. The graphics pipeline comprises the hardware and software that take input commands and produce therefrom data in the format of pixels. The pixels are output to frame buffer 532. Frame buffer 532 varies from a simple buffer capable of storing two-dimensional images, to a state-of-the-art device capable of displaying textured, three-dimensional, color images. Scan-out device 534 comprises rendering hardware that selectively reads the pixels from frame buffer 532 and transmits the pixels to display 536. Display 536 comprises, for example, a cathode ray tube (CRT) that provides a physical display of the pixels. The scan-out device 534 and display 536 comport in function with the sophistication of the frame buffer 532.

In this document, the term "computer readable medium" is used to generally refer to media such as removable storage medium 518, a hard disk installed in hard disk drive 512, and signals 526. These computer program products are means for providing software, in the form of program code or other instructions, to computer system 502.

The program code embodiments of the present invention, as described above, can be stored on a computer-readable medium and then loaded into the computer system 502 for execution by its processor 504. In such a case, the computer system 502 becomes an apparatus for carrying out the functions and features of the present invention. In yet another embodiment, the invention can be implemented primarily in hardware using, for example, hardware components such as application specific integrated circuits (ASICs) that perform the functions of the present invention, as described herein. Like a programmed computer system, these hardware components also comprise apparatus for carryout the invention.

Microsoft is a registered trademark of Microsoft Corporation. Java is a trademark of Sun Microsystems, Inc.

As the foregoing illustrates, the present invention is directed to a method, apparatus, and computer program product for enabling objects of an object-oriented environment to be persisted in a relational database. It is understood that changes may be made to the embodiments described above without departing from the broad inventive concepts thereof. Accordingly, the present invention is not limited to the particular embodiments disclosed, but is intended to cover all modifications that are within the spirit and scope of the invention as defined by the appended claims.

What is claimed is:

1. A computer readable medium having program code stored thereon that, when executed on a computer, enables an object of an object-oriented environment to be persisted in a relational database having a schema, said object being an instantiation of a class and having attributes, said program code comprising:
   a first method that, when invoked, causes the attributes of said object to be stored in a property bag;
   a second method that, when invoked, determines whether the schema of the relational database supports the storage of objects of said class, and if not, dynamically reconfigures the relational database using commands of a data definition language of the relational database so that the schema supports the storage of objects of said class; and
   a third method that, when invoked, generates commands of a data manipulation language of the relational database to store the attributes from the property bag of said object in the relational database.

2. The computer-readable medium recited in claim 1, wherein said second method first determines whether the schema of the relational database defines a table for the storage of attributes of objects of said class, and if not, generates commands of the data definition language to create such a table within the schema.

3. The computer-readable medium recited in claim 2, wherein the property bag specifies a name, a data type, and a value for each attribute of said object that is stored in the property bag, and further wherein if in said second method it is determined that a table already exists for the storage of attributes of objects of said class, then said second method further compares the attribute names and associated data types from the property bag of said object with the columns of said existing table to determine whether the table contains columns of the same name and data type as each attribute in the property bag, and if not, generates commands of the data definition language of the relational database to modify said existing table to provide columns for the storage of each such attribute.

4. The computer-readable medium recited in claim 1, wherein the object to be persisted contains nested objects, and wherein said first method further causes the attributes of each nested object to be stored in said property bag and augments the names of the attributes of each nested object to associate them with that nested object within the property bag.

5. A method for enabling objects of an object-oriented environment to be persisted in a relational database having a schema, each object being an instantiation of a class and having attributes, said method comprising:
   storing the attributes of an object to be persisted in a property bag;
   determining whether the schema of the relational database supports the storage of objects of the class of said object to be persisted, and if not, dynamically reconfiguring the relational database using commands of a data definition language of the relational database so that the schema supports the storage of objects of the class of said object to be persisted; and
   generating commands of a data manipulation language of the relational database to store in the relational database the attributes from said property bag of said object to be persisted.

6. The method recited in claim 5, wherein said determining step comprises determining whether the schema of the relational database defines a table for the storage of attributes of objects of said class, and wherein said dynamically reconfiguring step comprises generating commands of the data definition language to create such a table within the schema.

7. The method recited in claim 6, wherein the property bag specifies a name, a data type, and a value for each attribute of said object that is stored in the property bag, and further wherein if in said determining step it is determined that a table already exists for the storage of attributes of objects of said class, then said method further comprises comparing the attribute names and associated data types from the property bag of said object with the columns of said existing table to determine whether the table contains columns of the same name and data type as each attribute in the property bag, and if not, generating commands of the data definition language of the relational database to modify said existing table to provide columns for the storage of each such attribute.

8. The method recited in claim 5, wherein said object to be persisted contains nested objects, and wherein said step of storing the attributes of said object to be persisted in the property bag further comprises storing the attributes of each nested object in said property bag and augmenting the names of the attributes of each nested object to associate them with that nested object within the property bag.

9. Apparatus for enabling objects of an object-oriented environment to be persisted in a relational database having a schema, each object being an instantiation of a class and having attributes, said method comprising:
   means for storing the attributes of an object to be persisted in a property bag;
   means for determining whether the schema of the relational database supports the storage of objects of the class of said object to be persisted, and if not, for dynamically reconfiguring the relational database using commands of a data definition language of the relational database so that the schema supports the storage of objects of the class of said object to be persisted; and
   generating commands of a data manipulation language of the relational database to store in the relational database the attributes from said property bag of said object to be persisted.

10. The apparatus recited in claim 9, wherein said determining means comprises means for determining whether the schema of the relational database defines a table for the storage of attributes of objects of said class, and wherein said dynamically reconfiguring means comprises means for generating commands of the data definition language to create such a table within the schema.

11. The apparatus recited in claim 10, wherein the property bag specifies a name, a data type, and a value for each attribute of said object that is stored in the property bag, and further wherein if said determining means determines that a table already exists for the storage of attributes of objects of said class, then said determining means further compares the attribute names and associated data types from the property bag of said object to be persisted with the columns of said existing table to determine whether the table contains columns of the same name and data type as each attribute in the property bag, and if not, said dynamically reconfiguring means generates commands of the data definition language of the relational database to modify said existing table to provide columns for the storage of each such attribute.

12. The apparatus recited in claim 9, wherein said object to be persisted contains nested objects, and wherein said means for storing the attributes of said object to be persisted in the property bag also stores the attributes of each nested object in said property bag and augments the names of the attributes of each nested object to associate them with that nested object within the property bag.

* * * * *